US012074442B2

(12) United States Patent
Patel et al.

(10) Patent No.: US 12,074,442 B2
(45) Date of Patent: Aug. 27, 2024

(54) SYSTEMS AND METHODS FOR REACTIVE POWER MANAGEMENT DURING LOW VOLTAGE RIDE THROUGH IN DIFFERENT GRID OPERATING MODE

(71) Applicant: Cummins Power Generation Limited, London (GB)

(72) Inventors: Ankit Vinodchandra Patel, Kent (GB); Apoorv Prakash Hiremath, Kent (GB); Raghunandan Subramaniam, Kent (GB)

(73) Assignee: Cummins Power Generation Limited, Ramsgate (GB)

( * ) Notice: Subject to any disclaimer, the term of this patent is extended or adjusted under 35 U.S.C. 154(b) by 0 days.

(21) Appl. No.: 18/117,696

(22) Filed: Mar. 6, 2023

(65) Prior Publication Data

US 2023/0283075 A1 Sep. 7, 2023

Related U.S. Application Data

(63) Continuation of application No. 17/083,631, filed on Oct. 29, 2020, now Pat. No. 11,600,994.

(51) Int. Cl.
*H02J 3/18* (2006.01)
*G05B 19/042* (2006.01)
(Continued)

(52) U.S. Cl.
CPC ............ *H02J 3/18* (2013.01); *G05B 19/042* (2013.01); *H02J 3/0012* (2020.01);
(Continued)

(58) Field of Classification Search
CPC ...... H02J 3/18; H02J 3/0012; H02J 13/00002; H02J 2203/10; G05B 19/042; G05B 2219/2639
See application file for complete search history.

(56) References Cited

U.S. PATENT DOCUMENTS 5,376,877 A 12/1994 Kern et al.
2013/0077367 A1 3/2013 Zhu et al.
(Continued)

FOREIGN PATENT DOCUMENTS

WO WO-2011131655 A2 * 10/2011 ............. H02J 3/383
WO WO-2013/185772 A2 12/2013

OTHER PUBLICATIONS

Final Office Action on U.S. Appl. No. 17/083,631 DTD Jun. 9, 2022.
(Continued)

*Primary Examiner* — Charles Cai
(74) *Attorney, Agent, or Firm* — Foley & Lardner LLP (57) ABSTRACT

Systems and methods for managing reactive power during low voltage ride through are provided. Responsive to detecting a fault on a power grid, a controller may identify a power regulation mode of the generator system. The controller can switch the power regulation mode to an offset power regulation mode of the generator system responsive to identifying the power regulation mode. The controller may adjust a value of a parameter of the generator system from a normal value to an offset value, wherein the parameter is selected based on the offset power regulation mode. The controller can maintain the value of the parameter as the offset value for a period of time. After the period of time, the controller can modify the value of the parameter from the offset value to the normal value, and the power regulation mode from the offset power regulation mode to the identified power regulation mode.

20 Claims, 4 Drawing Sheets

(51) Int. Cl.
*H02J 3/00* (2006.01)
*H02J 13/00* (2006.01)
(52) U.S. Cl.
CPC *H02J 13/00002* (2020.01); *G05B 2219/2639* (2013.01); *H02J 2203/10* (2020.01)

(56) References Cited

U.S. PATENT DOCUMENTS

2015/0211492 A1* 7/2015 Garcia .................... F03D 7/048
 290/44
2019/0093634 A1* 3/2019 Biris ..................... F03D 7/0272

OTHER PUBLICATIONS

Foreign Search Report on EP 21205043.9 DTD Mar. 30, 2022.
Notice of Allowance on U.S. Appl. No. 17/083,631 DTD Nov. 3, 2022.
US Office Action on U.S. Appl. No. 17/083,631 DTD Feb. 2, 2022.

* cited by examiner

SYSTEMS AND METHODS FOR REACTIVE POWER MANAGEMENT DURING LOW VOLTAGE RIDE THROUGH IN DIFFERENT GRID OPERATING MODE

CROSS REFERENCE TO RELATED APPLICATIONS

This application is a continuation of U.S. patent application Ser. No. 17/083,631, filed Oct. 29, 2020, entitled "Systems and Methods for Reactive Power Management During Low Voltage Ride Through in Different Grid Operating Mode", the entirety of which is incorporated by reference herein.

TECHNICAL FIELD

The present disclosure relates generally to the field of electrical power generation. More particularly, the present disclosure relates to systems and methods for managing reactive power during a fault on a power grid.

BACKGROUND

Generators can be connected to a power grid to supply power to various loads. The power output of a generator includes real power and reactive power. The ratio between real power and reactive power define a power factor. The power grid requires stable voltage in order to prevent damage to the various loads. In a situation where a voltage on the power grid drops below a set voltage, the generator can supply reactive power in order to support the voltage on the power grid. However, upon recovery of the voltage on the power grid, the generator may consume reactive power from the grid, which may cause further undesired fluctuations in voltage.

SUMMARY

One embodiment of the disclosure relates to a method of controlling a reactive power output of a power generator system during a fault. The method includes detecting, by a controller of a generator system, the fault on a power grid. The method includes identifying, by the controller, a power regulation mode of the generator system responsive to detecting the fault. The method includes switching, by the controller, the power regulation mode to an offset power regulation mode of the generator system responsive to identifying the power regulation mode. The method includes adjusting, by the controller, a value of a parameter of the generator system from a normal value to an offset value, wherein the parameter is selected based on the offset power regulation mode. The method includes maintaining, by the controller, the value of the parameter as the offset value for a period of time to regulate an amount of reactive current consumed by the generator system. The method includes modifying, by the controller, the value of the parameter from the offset value to the normal value, and the power regulation mode from the offset power regulation mode to the identified power regulation mode after the period of time.

In some embodiments, the fault comprises a low voltage ride-through (LVRT) event. In some embodiments, the controller may identify the parameter based on the power regulation mode, wherein the parameter comprises at least one of a power factor, an output voltage, a reactive power, or an active power. In some embodiments, the power regulation mode comprises a power factor regulation mode in which the controller adjusts or is configured to adjust the power factor to regulate a reactive power of the generator system. In some embodiments, the power regulation mode comprises a reactive power regulation over voltage changes mode in which the controller adjusts or is configured to adjust the output voltage to regulate the reactive power of the generator system. In some embodiments, the power regulation mode comprises a reactive power regulation mode in which the controller adjusts or is configured to adjust a reactive power set point by supplying a field current to regulate the reactive power of the generator system. In some embodiments, the power regulation mode comprises a reactive power regulation over active power changes mode in which the controller adjusts or is configured to adjust an active power to regulate the reactive power of the generator system.

In some embodiments, the controller may select the offset power regulation mode based on the power regulation mode. In some embodiments, the controller can adjust the value of the parameter to the offset value using a predetermined offset, wherein the predetermined offset may comprise at least one of a power factor offset, a voltage offset, a reactive power offset, or an active power offset. In some embodiments, the offset power regulation mode comprises a power factor offset regulation mode in which the controller adjusts or is configured to adjust a value of the power factor using the predetermined offset to regulate the amount of reactive current consumed by the generator system. In some embodiments, the offset power regulation mode comprises a reactive power regulation over voltage offset mode in which the controller adjusts or is configured to adjust a value of the output voltage using the predetermined offset to regulate the amount of reactive current consumed by the generator. In some embodiments, the offset power regulation mode comprises a reactive power offset regulation mode in which the controller adjusts or is configured to adjust a value of the reactive power using the predetermined offset to regulate the amount of reactive current consumed by the generator. In some embodiments, the offset power regulation mode comprises a reactive power regulation over active power offset mode in which the controller adjusts or is configured to adjust a value of the active power using the predetermined offset to regulate the amount of reactive current consumed by the generator.

In some embodiments, the normal value of the parameter comprises the value of the parameter prior to detecting the fault. In some embodiments, the offset value of the parameter comprises the normal value adjusted by a predetermined offset. In some embodiments, the predetermined offset is large enough such that the generator system does not increase its reactive power consumption by more than a defined value. In some embodiments, the period of time comprises a duration of the fault or 2-3 seconds following the duration of the fault.

Another embodiment relates to a controller of a generator. The controller includes a processing circuit configured to detect a fault on a power grid. The controller includes a processing circuit configured to identify a power regulation mode of a generator system responsive to detecting the fault. The controller includes a processing circuit configured to switch the power regulation mode to an offset power regulation mode of the generator system responsive to identifying the power regulation mode. The controller includes a processing circuit configured to adjust a value of a parameter of the generator system from a normal value to an offset value, wherein the parameter is selected based on the power offset regulation mode. The controller includes a processing circuit configured to maintain the value of the parameter as the offset value for a period of time to regulate an amount of reactive current consumed by the generator system. The controller includes a processing circuit configured to modify the value of the parameter from the offset value to the normal value and the power regulation mode from the offset power regulation mode to the identified power regulation mode after the period of time.

In some embodiments, the controller can be configured to identify the parameter based on the power regulation mode, wherein the parameter comprises at least one of a power factor, an output voltage, a reactive power, or an active power. In some embodiments, the controller can be configured to select the offset power regulation mode based on the power regulation mode. In some embodiments, the controller can be configured to adjust the value of the parameter to the offset value using a predetermined offset, wherein the predetermined offset may comprise at least one of a power factor offset, a voltage offset, a reactive power offset, or an active power offset.

In some embodiments, the power regulation mode comprises a power factor regulation mode in which the processing circuit is configured to adjust the power factor to regulate a reactive power of the generator system. In some embodiments, the power regulation mode comprises a reactive power regulation over voltage changes mode in which the processing circuit is configured to adjust the output voltage to regulate the reactive power of the generator system. In some embodiments, the power regulation mode comprises a reactive power regulation mode in which the processing circuit is configured to adjust a reactive power set point by supplying a field current to regulate the reactive power of the generator system. In some embodiments, the power regulation mode comprises a reactive power regulation over active power changes mode in which the processing circuit is configured to adjust an active power to regulate the reactive power of the generator system.

In some embodiments, the offset power regulation mode comprises a power factor offset regulation mode in which the processing circuit is configured to adjust a value of the power factor using the predetermined offset to regulate the amount of reactive current consumed by the generator system. In some embodiments, the offset power regulation mode comprises a reactive power regulation over voltage offset mode in which the processing circuit is configured to adjust a value of the output voltage using the predetermined offset to regulate the amount of reactive current consumed by the generator system. In some embodiments, the offset power regulation mode comprises a reactive power offset regulation mode in which the processing circuit is configured to adjust a value of the reactive power using the predetermined offset to regulate the amount of reactive current consumed by the generator system. In some embodiments, the offset power regulation mode comprises a reactive power regulation over active power offset mode in which the processing circuit is configured to adjust a value of the active power using the predetermined offset to regulate the amount of reactive current consumed by the generator system.

Another embodiment relates to a power generator system. The power generator system includes a generator configured to supply power to a power grid. The power generator system includes a voltage regulator configured to regulate a voltage of an output of the generator, a power factor of the output, a reactive power of the output, or an active power of the output to a normal value or an offset value. The power generator system includes a controller configured to detect a fault on a power grid. The power generator system includes a controller configured to identify a power regulation mode of a generator system responsive to detecting the fault. The power generator system includes a controller configured to switch the power regulation mode to an offset power regulation mode of the generator system responsive to identifying the power regulation mode. The power generator system includes a controller configured to adjust a value of a parameter of the generator system from a normal value to an offset value, wherein the parameter is selected based on the power offset regulation mode. The power generator system includes a controller configured to maintain the value of the parameter as the offset value for a period of time to regulate an amount of reactive current consumed by the generator system. The power generator system includes a controller configured to modify the value of the parameter from the offset value to the normal value and the power regulation mode from the offset power regulation mode to the identified power regulation mode after the period of time.

In some embodiments, the controller can be configured to identify the parameter based on the power regulation mode, wherein the parameter comprises at least one of a power factor, an output voltage, a reactive power, or an active power. In some embodiments, the controller can be configured to select the offset power regulation mode based on the power regulation mode. In some embodiments, the controller can be configured to adjust the value of the parameter to the offset value using a predetermined offset, wherein the predetermined offset may comprise at least one of a power factor offset, a voltage offset, a reactive power offset, or an active power offset.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods that may be used to power loads in conjunction with generators are provided according to exemplary embodiments. One or more generators (e.g., generator sets, or gensets) are used to provide power to one or more loads on a power grid. The power grid may have one or more generator sets (e.g., a plurality of generator sets, or one or more generator sets and one or more energy storage devices, connected in parallel) that support the power grid and thereby the loads of the power grid. The generator sets have controllers that maintain a power factor for each generator set. The power factor is the ratio of real power to reactive power output by the generator sets. In a stable operating condition, the controllers maximize the power factor in order to ensure that the generator sets are operating at maximum efficiency (e.g., that the generator sets are producing as much real power as possible and not wasting fuel or other resources by generating excess reactive power.)

However, the power demands of the generators connected to the power grid may vary with changing conditions, such as increasing and decreasing draw on the power grid. For example, a large draw on the grid (e.g., a factory starting large industrial equipment, generally a large inductive load) may cause the voltage on the power grid to drop suddenly. In this example, the power grid requires support from the generator sets connected to the power grid in order to recover/support the voltage quickly and regulate an amount of reactive current supplied to (or consumed by) the power grid, thereby avoiding any damage to electronics and other electrical equipment also connected to the power grid. Reactive power exists in an AC circuit when the current and voltage are not in phase and defines the power factor of the system. Volt-ampere reactive (VAR) is a unit of measurement of reactive power. The power factor of an AC electrical power system is the ratio of the real power absorbed by the load to the apparent power flowing in the circuit. The generator sets support the power grid and keep the voltage steady by outputting reactive power. However, once the voltage has recovered, the generator sets may consume reactive power from power grid due to the generator sets controllers attempting to recover the generator set to the pre-fault power factor or grid voltage, which causes further variances in the voltage on the power grid. This is undesirable and in fact not in compliance with grid code compliance (GCC) in certain areas (e.g., Europe).

Certain grid codes may require a generator system to operate in one or more reactive power regulation modes (e.g., power factor regulation mode, reactive power regulation over voltage changes mode, reactive power regulation mode, reactive power regulation over active power changes mode, or other modes). Responsive to a fault (e.g., a low voltage ride-through (LVRT) event, an over voltage ride-through (OVRT) event, or other faults), the generator system may consume (or supply) reactive power (e.g., reactive current) from (or to) the power grid. Some grid codes may require the generator system to consume less than a certain amount (e.g., 5% or other percentage values) of reactive current from the power grid responsive to the occurrence of a fault. In addition, the grid codes may require the generator system to return to pre-fault conditions within a predetermined period of time (e.g., at least 2 seconds after the occurrence of the fault or other conditions). Certain approaches to regulating the amount of reactive current consumed by the generator system (e.g., in response to a fault) can use an artificial offset to modify the value of a parameter of the generator system (e.g., the power factor), thereby allowing the generator system to be in compliance with grid code requirements (e.g., generator system consumes less than a certain amount of reactive current). However, the same artificial offset can be ineffective (e.g., the generator system fails to support the reactive power response) when the generator system is operating under certain reactive power regulation modes (e.g., reactive power regulation over voltage changes mode, reactive power regulation mode, reactive power regulation over active power changes mode, or other modes).

To address the issue of preventing generator systems from consuming excessive reactive power after a fault, the present disclosure provides exemplary systems and methods for controlling reactive power output of a power generator system that needs to comply with GCC. An exemplary method includes a power generator system that can detect a fault on a power grid. Responsive to detecting the fault, a controller of the power generator system can identify a power regulation mode. The controller can switch the power regulation mode to an offset power regulation mode of the generator system responsive to identifying the power regulation mode. The controller may adjust a value of a parameter of the generator system from a normal value to an offset value and maintain the value of the parameter as the offset value for a period of time. After the period of time, the controller can modify the value of the parameter and the power regulation mode to pre-fault conditions (e.g., the normal value of the parameter and the identified power regulation mode).

Figure 1:
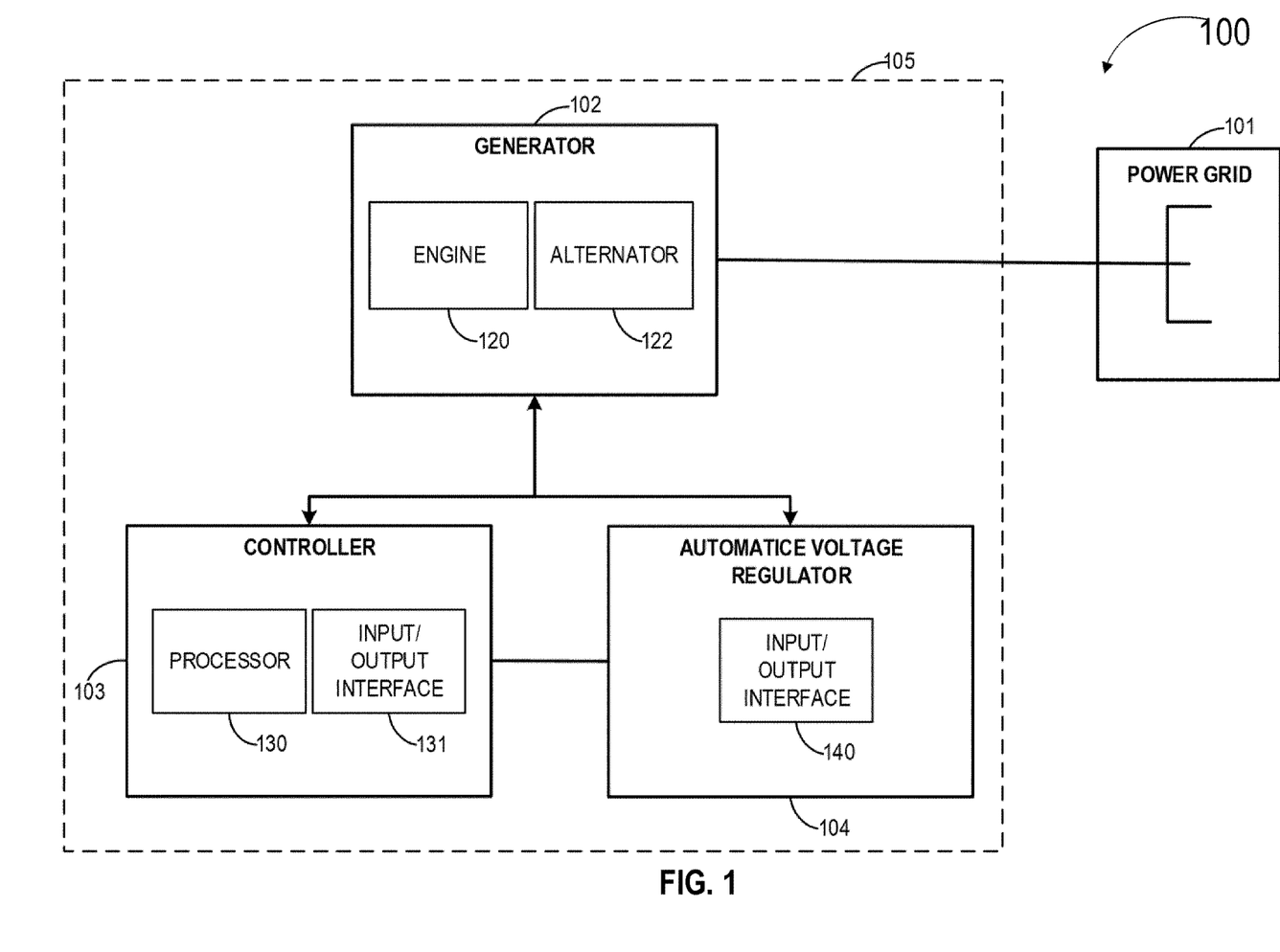
FIG. 1 is a block diagram illustrating a generator system according to an exemplary embodiment.

Referring to FIG. 1, a block diagram illustrating a generator system 100 according to an exemplary embodiment is shown. In the illustrated embodiment, the generator system 100 includes a generator 102, a controller 103, and an automatic voltage regulator (AVR) 104. In some embodiments, the generator system 100 may include one or more generators 102. In some embodiments, a housing 105 of the generator system 100 can include the generator 102, the controller 103 and the AVR 104 (e.g., the same generator system 100 can include the generator 102, the controller 103, and the AVR 104). In some embodiments, the generator 102 can be separate and communicatively coupled to the controller 103 and the AVR 104, such that the controller 103 and the AVR 104 are separate from the generator system 100. The generator 102 may include an engine 120 coupled to an alternator 122. In some embodiments, the generator 102 may include one or more engines 120 and alternators 122. The engine 120 may be any type of machine configured to convert energy, such as fuel, into mechanical energy (e.g., motion). The engine 120 may be an internal combustion engine, such as a diesel engine.

The alternator 122 may be any type of machine configured to convert mechanical energy into electrical energy, such as an alternating current. In some embodiments, the alternator 122 includes a field winding, a rotor, and multiple poles. The field winding may be excited with a direct current (DC) in order to create a magnetic field and adjust the power factor. The rotor may be driven by the engine 120 and thereby create electric power. In some embodiments, generator 102 may include different and/or additional components than engine 120 and alternator 122 (e.g., a hydraulically powered generator driven using hydraulic fluid). The generator system 100 may be a mastered or masterless system (e.g., a masterless load demand genset system or a mastered paralleled genset system, with a centralized system controller coordinating the generators 102 of the system 100, or a distributed system 100 control contained in the generators 102 of the system 100, respectively).

An output of the generator 102 is connected to a power grid 101. The power grid 101 may be a local power grid (e.g., a power grid for a building, or multiple rooms) or a larger power grid 101 that supports one or more cities, towns, or villages. In some embodiments, the power grid 101 includes three phases. In this example, the generator 102 may include three outputs where each output is connected to one of the three phases. In alternative embodiments, the power grid 101 may include one or more phases, and the generator 102 may include any number of outputs connected to the one or more phases.

The automatic voltage regulator (AVR) 104 may include an input/output interface 140. The AVR 104 may also include various hardware components to implement the AVR 104 either with static electronics or dynamic moving parts. In some embodiments, the input/output interface 140 includes an electrical bus. The input/output interface 140 may include a first input terminal that is connected to the output of the generator 102 and that is configured to monitor the output characteristics of the generator 102. In one example, the AVR 104 may monitor the output voltage of the generator 102 in order to ensure that the voltage at the output is within a pre-determined range. The voltage at the output of the generator 102 may be maintained within a range to support the power grid 101. The voltage at the output of the generator 102 (and thereby on the power grid 101) will be affected by the loads on the power grid 101. For example, if a large industrial load is added to the power grid 101, the voltage of the power grid 101 (and thereby the voltage of the output of the generator 102) will dip until the power grid 101 receives enough power to drive the large industrial load (large inductive loads, such as large electric machinery or motors, can alter the power factor of the grid 101). The AVR 104 may control the engine or alternator in order to regulate the voltage on the output of the generator 102.

Additionally or alternatively, the first input may also monitor the phase of the voltage and current on the output of the generator 102 in order to detect a power factor (via the leading or lagging current and voltage phases) of the output of the generator 102. In other embodiments, one or more first input terminals may be used by the AVR 104 in order to monitor the voltage, power factor, power (e.g., reactive power), and current of the output of the generator 102. In some embodiments, the AVR 104 may include sensors to monitor the voltage, power factor, power, and current on the output of the generator 102. In some embodiments, the AVR 104 may receive via the one or more input terminals outputs from sensors that sense the voltage and current of the output of the generator 102. In some embodiments, the AVR 104 has a first priority to regulate the voltage on the output and a second priority to regulate the power factor of the generator 102. In some embodiments, the AVR 104 may monitor the line voltage between one or more outputs on the generator 102. The one or more outputs on the generator 102 may each be connected to phase of the power grid 101. In some embodiments the AVR 104 may monitor the phase voltage (e.g., the phase to neutral voltage) between the one or more outputs of the generator 102 that are each connected to a phase of the power grid 101.

The input/output interface 140 may include a second input terminal that is connected to the controller 103 that is configured to receive a signal that indicates a set power factor for the generator system 100. In this example, a signal (e.g., a DC signal) may indicate to the AVR 104 that the set power factor should be at a maximum (e.g., determined based on the particular generator 102). In one example, the maximum set power factor is 0.9 or larger. In another example, the signal may indicate to the AVR 104 that the set power factor should be at a minimum. In this example, AVR 104 the power factor may be around 0.6. The second input terminal of the input/output interface 140 can be configured to receive a signal (e.g., from the controller 103) that indicates a fault (e.g., LVRT or OVRT) has occurred. It is to be appreciated that these examples are only some potential implementations, in other embodiments, other signals may be input via the second input terminal that indicate to the AVR 104 the set power factor. In other embodiments, the AVR 104 may be integrated with the controller 103. In yet other embodiments, one or more second input terminals may be used by the AVR 104 in order to receive information regarding the set power factor and the set voltage from the controller 103.

The input/output interface 140 may include a first output terminal that may be connected to the generator 102 in order to control the power factor and current of the output of the generator 102. For example, in some embodiments, the first output terminal may be connected to a field winding of the alternator 122 in order to induce or control a direct current into the field winding in order to control the power factor of the output of the generator 102. In other embodiments, the AVR 104 may control the actual power factor of the output of the generator 102 via other facilitations or designs. In some embodiments, one or more first output terminals may be used by the AVR 104 in order to control the power factor and the voltage of the output of the generator 102. For example, the AVR 104 may utilize one or more first output terminals to increase excitation current in to alternator exciter 122 part of generator 102 to regulate the voltage to the set voltage. In other embodiments, other methods of techniques may be used to regulate the voltage of the output of the generator 102 and regulate the power factor of the output of the generator 102.

The input/output interface 140 may include a second output terminal connected to the controller 103 and configured to provide the controller 103 with feedback regarding the output of the generator 102 (e.g., voltage, leading or lagging current, power factor, reactive current, etc.) or the state of the AVR 104 (e.g., set power factor.) In some embodiments, one or more second output terminals may be connected to the controller 103 in order to provide the controller 103 with feedback. In some embodiments, the input/output interface 140 may be wired via a physical electrical connection to the other components. In some embodiments, the input/output interface 140 may be wired via a physical electrical connection to some components (e.g., to the generator 102) and wirelessly connected to some components (e.g., to the controller, or the sensors monitoring the output of the generator 102). In some embodiments, the input/output interface 140 is connected to all of the other components wirelessly. That is, it is to be appreciated that terms such as "terminal" are not meant to be limited to a physical terminal configured to be connected physically to another device or "terminal" unless expressly recited.

The controller 103 may include a processing circuit 130 and an input/output terminal 131. The processing circuit 130 may include one or more processing circuits 130 or one or more processing circuits 130 that include multiple processing cores. The controller 103 may also include a memory device that is configured to store machine-readable media. The machine readable media being readable by the processing circuit 130 in order to execute the programs stored therein. The memory device may also include a database of set values, interpolation graphs (e.g., data), or other control or calculation parameters.

The input/output interface 131 may include one or more terminals configured to connect to the AVR 104 or the generator 102. For example, as discussed above, a first output terminal of the input/output interface 131 may be connected to the second input terminal of the AVR 104 in order to signal to the AVR 104 the set power factor. Additionally, as discussed above, the input/output interface 131 may include a first input terminal configured to connect to the second output terminal of the AVR 104 in order to receive feedback or other information from the AVR. The first input terminal and the first output terminal of the input/output interface 131 may be embodied as one or more physical contacts or as a combination of physical electrical contacts and wireless terminals.

In some embodiments, the input/output interface 131 may also include a second input terminal that may be connected to one or more sensors (not depicted) that measure the voltage, power factor, power, and current of the output of the generator 102. In some embodiments, the controller 103 receives the information regarding the voltage, power factor, power, and current of the output of the generator 102 directly from the sensors monitoring the output. In some embodiments, the controller 103 receives the information regarding the voltage, power factor, power, and current of the output of the generator 102 from the AVR 104. In some embodiments, the controller 103 may receive information regarding the voltage, power factor, power, and current of the output of the generator 102 from multiples sources (e.g., the AVR 104 and the sensors). The second input terminal may be embodied as one or more physical contacts or a combination of physical electrical contacts on a bus and wireless terminals. In some embodiments, the AVR 104 and the controller 103 may be integrated into one device and the communication may be more direct. Additionally or alternatively, the controller 103 may be connected to the generator 102 in a similar manner as the AVR 104 such that the controller 103 may perform the functions as described in reference to the AVR 104.

The controller 103 is configured to detect a fault (e.g., a LVRT, an OVRT, or other faults) on a power grid. Responsive to detecting the fault, the controller 103 is configured to identify a power regulation mode (e.g., a power factor regulation mode, a reactive power regulation over voltage changes mode, a reactive power regulation mode, a reactive power regulation over active power changes mode, or other modes). The controller 103 is configured to switch the power regulation mode to an offset power regulation, responsive to identifying the power regulation mode. The controller 103 is configured to adjust a value of a parameter of the generator system 100 from a normal value to an offset value and maintain the value of the parameter as the offset value for a period of time. The controller 103 is configured to modify the value of the parameter from the offset value to the normal value, and the power regulation mode from the offset power regulation mode to the identified power regulation mode after the period of time.

Figure 2:
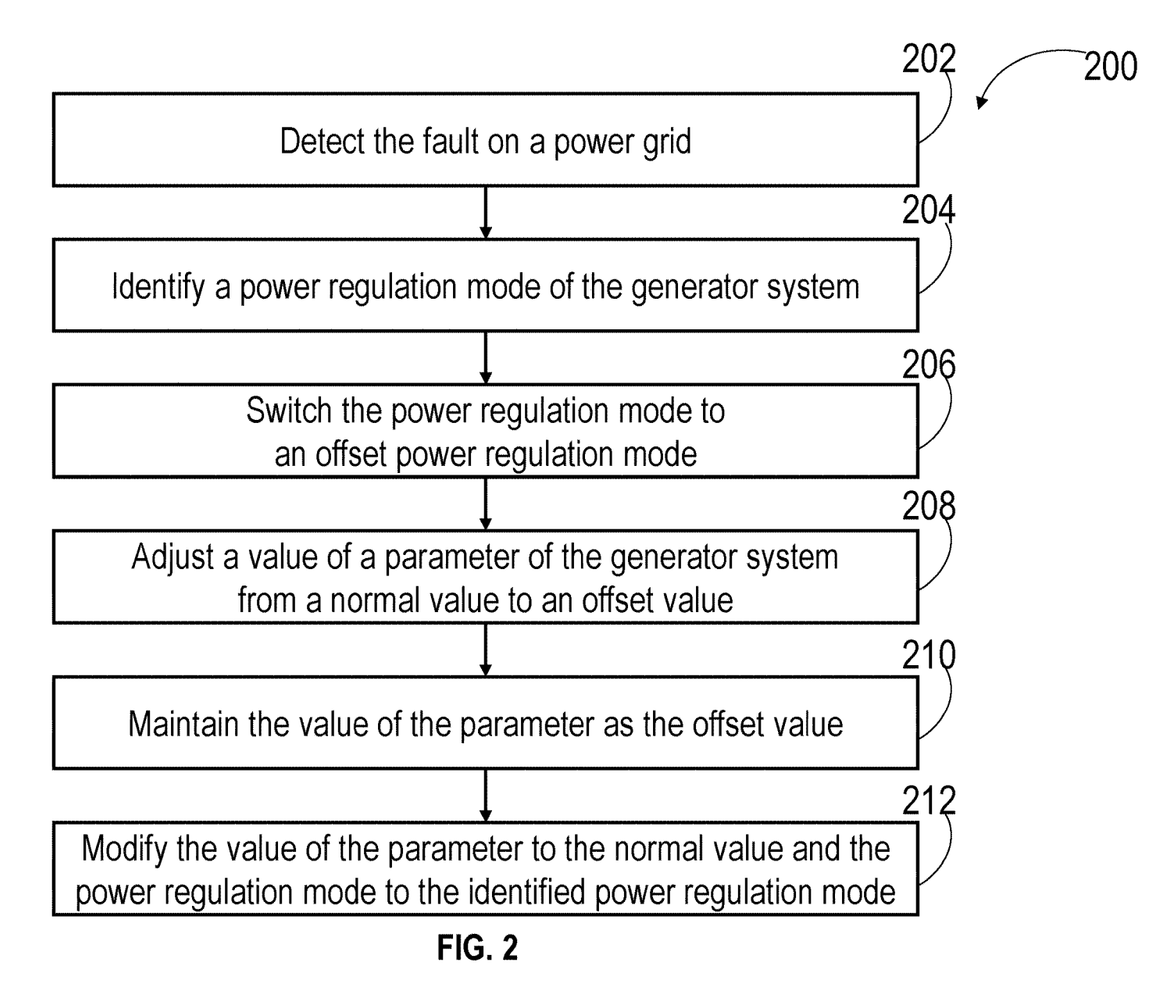
FIG. 2 is a flow diagram of a method for controlling a reactive power output of a generator system during a fault according to an exemplary embodiment.

FIG. 2 illustrates a flow diagram of a method 200 for controlling a reactive power output of a generator system 100 during a fault according to an exemplary embodiment. The method 200 may be implemented using any of the components and devices detailed herein in conjunction with FIG. 1. In overview, the method 200 may include detecting a fault on a power grid (202). The method 200 may include identifying a power regulation mode of the generator system (204). The method 200 may include switching the power regulation mode to an offset power regulation mode (206). The method 200 may include adjusting a value of a parameter of the generator system from a normal value to an offset value (208). The method 200 may include maintaining the value of the parameter as the offset value (210). The method 200 may include modifying the value of the parameter to the normal value and the power regulation mode to the identified power regulation mode (212).

Referring now to operation 202, and in some embodiments, a controller 103 of a generator system 100 can detect a fault on a power grid. In some embodiments, the fault is that the voltage on the output of the generator 102 is below an amount (e.g., 95%) of a set voltage (e.g., a pre-determined or nominal voltage). In some embodiments, the fault is that the voltage on the output of the generator 102 is below 90% (or other percentage values) the set voltage. In other embodiments, the percentage of the set voltage that triggers the fault may be set within a range of 85%-98% (or other percentage values). In some embodiments, the AVR 104 or the controller 103 may detect the fault on an output of the generator 102. For example, the AVR 104 or the controller 103 can compare an output voltage of the generator 102 to a set of voltage values that define a range (e.g., 85%-98% of the set voltage). If the output voltage of the generator 102 is outside the defined range, the AVR 104 or the controller 103 can detect a fault. The generator system 100 needs to react to the fault in order to stay connected to the power grid 101 an in compliance with GCC. The capability of reacting to the fault and staying connected to the power grid 101 by the generator system 100 may be known as a fault ride through (FRT), an under voltage ride through (UVRT), or a low voltage ride through (LVRT). If the controller 103 or the AVR 104 detect at least one fault, the controller 103 may identify a power regulation mode of the generator system.

Referring now to operation 204, and in some embodiments, the controller 103 can identify a power regulation mode of the generator system 100. Responsive to detecting the fault, the controller 103 may identify the power regulation mode of the generator system 100. The power regulation mode comprises at least one of a power factor regulation mode (Base P.F.), a reactive power regulation over voltage changes mode (Q(U)), a reactive power regulation mode (Base Q), a reactive power regulation over active power changes mode (Q(P)), or other power regulation modes. If the generator system 100 operates in power factor regulation mode, the controller 103 can regulate the reactive power of the generator system 100 by modifying the power factor of the generator system 100. For example, if the generator system 100 operates in power factor regulation mode, the AVR 104 and/or the controller 103 may regulate the reactive power (or reactive current) of the output of the generator 102 by monitoring and adjusting the power factor of the output of the generator 102. In some embodiments, the AVR 104 and/or the controller 103 can regulate the reactive power by using a set value of the power factor (e.g., 0.9 or larger). In some embodiments, the AVR 104 may provide the controller 103 with feedback associated to the output of the generator 102 (e.g., voltage, leading or lagging current, power factor, reactive current, or other parameters). The controller 103 may use the feedback (e.g., provided by the AVR 104 or other components of the generator system 100) to adjust one or more parameters of the generator system 100 (e.g., power factor, output voltage, reactive power, active power, or other parameters) and therefore regulate the reactive power of the output of the generator 102.

If the generator system 100 operates in a reactive power regulation over voltage changes mode, the controller 103 can adjust the output voltage of the generator system 100 to regulate the reactive power of the generator system 100. In one example, if the generator system 100 utilizes the reactive power regulation over voltage changes mode, the AVR 104 and/or the controller 103 may regulate the reactive power (or reactive current) of the output of the generator 102 by monitoring and adjusting the voltage of the output of the generator 102. In some embodiments, the AVR 104 and/or the controller 103 can use a set voltage value (e.g., 220 V, 240 V, or other voltage values) to regulate the reactive power. If the generator system 100 operates in a reactive power regulation mode, the controller 103 can regulate the reactive power of the generator system 100 by adjusting a reactive power set point. The reactive power set point (e.g., a nominal value of reactive power) can be adjusted by supplying or modifying a field current (e.g., a current supplied to the field windings of the generator 102) or other currents. In one example, if the generator system 100 operates in reactive power regulation mode, the AVR 104 and/or the controller 103 may modify the reactive power set point of the generator 102 (e.g., by modifying the field current) to regulate the reactive power (or reactive current) of the output of the generator 102. In some embodiments, the AVR 104 and/or the controller 103 can regulate the reactive power by using a set/nominal reactive power value (e.g., pre-selected or pre-determined).

If the generator system 100 operates in a reactive power regulation over active power changes mode, the controller 103 can regulate the reactive power of the generator system 100 by adjusting the active power of the generator system 100. For instance, if the generator system 100 operates in reactive power regulation over active power changes mode, the AVR 104 and/or the controller 103 may regulate the reactive power (or reactive current) of the output of the generator 102 by monitoring and modifying the active power of the output of the generator 102. In some embodiments, the AVR 104 and/or the controller 103 can use a set active power value (e.g., pre-determined or pre-selected) to regulate the reactive power.

Referring now to operation 206, and in some embodiments, the controller 103 can switch the power regulation mode to an offset power regulation mode. Responsive to identifying the power regulation mode, the controller 103 can switch or change the power regulation mode of the generator system 100 from the identified power regulation mode to an offset power regulation mode. For example, responsive to detecting a fault, the controller 103 may identify the generator system 100 operates in power factor regulation mode. Once the controller 103 identifies the power regulation mode, the controller 103 may switch the power regulation mode of the generator system 100 to a power factor offset regulation mode (or other modes). The offset power regulation mode comprises at least one of a power factor offset regulation mode, a reactive power regulation over voltage offset mode, a reactive power offset regulation mode, a reactive power regulation over active power offset mode, or other power regulation modes.

If the generator system 100 operates in power factor offset regulation mode, the controller 103 can regulate the amount of reactive current (or reactive power) consumed (or supplied) by the generator system 100 by adjusting a value of the power factor (e.g., of the output of the generator 102) using a predetermined offset. For example, if the generator system 100 operates in power factor offset regulation mode, the AVR 104 and/or the controller 103 may regulate the amount of reactive current consumed by the generator system 100 (e.g., in response to a fault) by applying a pre-determined offset (e.g., power factor offset) to the power factor value of the output of the generator 102 (e.g., adjusting the value of the power factor). Therefore, the controller 103 can select an appropriate reference bias signal (e.g., pre-determined offset) based on the identified power regulation mode or offset power regulation mode. Selecting the appropriate bias signal (e.g., a power factor offset, a voltage offset, a reactive power offset, an active power offset, or other offsets) may improve the reactive power response of the generator system 100 to a fault (e.g., LVRT). Furthermore, switching the power regulation mode to an offset power regulation mode (e.g., adjusting a parameter of the generator system 100) can prevent inadvertent consumption of reactive power (or reactive current) by the generator system 100 at least until the LVRT event (or other faults) passes.

If the generator system 100 operates in reactive power regulation over voltage offset mode, the controller 103 can adjust a voltage value (e.g., of the output of the generator 102) using a predetermined offset to regulate the amount of reactive current (or reactive power) consumed (or supplied) by the generator system 100 (e.g., responsive to a fault). For instance, if the generator system 100 operates in power regulation over voltage offset mode, the AVR 104 and/or the controller 103 may apply a pre-determined offset (e.g., a voltage offset) to the voltage value of the output of the generator 102 (e.g., adjusting the value of the output voltage) to regulate the amount of reactive current consumed by the generator system 100. If the generator system 100 uses a reactive power offset regulation mode, the controller 103 can regulate the amount of reactive current (or reactive power) consumed (or supplied) by the generator system 100 (e.g., responsive to a fault) by adjusting a reactive power value (e.g., of the output of the generator 102) using a predetermined offset. For instance, if the generator system 100 operates in reactive power offset regulation mode, the AVR 104 and/or the controller 103 may regulate the amount of reactive current consumed by the generator system 100 by modifying the value of reactive power of the output of the generator 102 (e.g., adjusting the value of reactive power) using a pre-determined offset (e.g., a reactive power offset).

If the generator system 100 operates in reactive power regulation over active power offset mode, the controller 103 can regulate the amount of reactive current (or reactive power) consumed (or supplied) by the generator system 100 by adjusting a value of the active power (e.g., of the output of the generator 102) using a predetermined offset. For example, if the generator system 100 operates in reactive power regulation over active power offset mode, the AVR 104 and/or the controller 103 may regulate the amount of reactive current consumed by the generator system 100 (e.g., in response to a fault) by applying a pre-determined offset (e.g., active power offset) to the active power value of the output of the generator 102 (e.g., adjusting the value of the active power). In some embodiments, the controller 103 may select the offset power regulation mode based on the identified power regulation mode. For example, the controller 103 can identify the generator system 100 is using a reactive power regulation mode. Based on the identified power regulation mode (e.g., reactive power regulation mode), the controller 103 may select the reactive power offset regulation mode. Responsive to selecting an offset power regulation mode (e.g., reactive power offset regulation mode or other modes), the controller 103 may switch the generator system 100 from the identified power regulation mode to the selected power regulation mode.

Referring now to operation 208, and in some embodiments, the controller 103 can adjust a value of a parameter of the generator system 100 from a normal value to an offset value. The parameter comprises at least one of a power factor, an output voltage, a reactive power, an active power, or other parameters of the generator system 100. The parameters of the generator system 100 may correspond to the parameters of the output of the generator 102 (e.g., the power factor of the output of the generator 102 or other parameters). The parameters of the generator system 100 (e.g., prior to or after adjustment) may be used as one or more input values to the controller 103. By using the parameters as the input values to the controller 103, the controller 103 can be caused to adjust the amount of reactive power (or reactive current) consumed by the generator system 100.

The controller 103 (or other components of the generator system 100) can select the parameter to be adjusted (e.g., adjusted by the controller 103) based on the offset power regulation mode or the power regulation mode. For example, the generator system 100 may operate in reactive power regulation over voltage changes mode when a LVRT (or other faults) occurs. Responsive to the fault, the controller 103 may identify the power regulation mode corresponds to the reactive power regulation over voltage changes mode. Therefore, the controller 103 may use the knowledge of the identified power regulation mode to select the parameter to be adjusted, wherein the parameter corresponds to the output voltage of the generator 102 (or other parameters of the generator system 100). If the identified power regulation mode corresponds to the power factor regulation mode (or power factor offset regulation mode), the controller 103 may select the power factor of the generator system 100 as the parameter. If the generator system 100 operates in reactive power regulation mode (or reactive power offset regulation mode), the controller 103 may select the reactive power of the generator system 100. If the generator system 100 operates in reactive power regulation over active power changes mode (or reactive power regulation over active power offset mode), the controller 103 may select the active power of the generator system 100.

In some embodiments, the controller 103 may adjust the value of the parameter from the normal value to the offset value using a predetermined offset. The normal value includes the value of the parameter prior to detecting the fault (e.g., a nominal value or a set value). For example, the normal value of the output voltage of the generator 102 may correspond to the output voltage of the generator 102 prior to a LVRT event. The offset value includes the normal value adjusted by a predetermined offset. For example, the offset value may comprise the output voltage of the generator 102 prior to the LVRT event adjusted by a voltage offset. In some embodiments, the predetermined offset is large enough such that the generator system 100 does not increase its reactive power (or reactive current) consumption by more than a defined value (e.g., by more than 5% or other percentage values). The controller 103 (or other components of the generator system 100) can select the predetermined offset based on the offset power regulation mode or the power regulation mode.

The predetermined offset comprises a power factor offset, a voltage offset, a reactive power offset, an active power offset, or other offsets. The controller 103 may use the predetermined offset to adjust the value of the parameter during a fault (e.g., LVRT) by artificially offsetting the normal value (e.g., adjusting the value from the normal value to the offset value). Adjusting the value of the parameter may cause the controller 103 to change its operating state and prevent inadvertent consumption of reactive power (e.g., by the generator system 100) until the fault (e.g., LVRT event) passes. For instance, the controller 103 can identify the generator system 100 operates in a reactive power regulation over active power changes mode (or other modes). If the power regulation mode corresponds to the reactive power regulation over active power changes mode, the controller 103 can adjust the value of the active power of the generator system 100. The controller 103 may adjust the value of the active power by adding (or performing other operations) an active power offset to the value of the active power of the generator system 100. Responsive to adjusting the value of the active power, the controller 103 can prevent the generator system 100 from consuming more than 5% (or other percentage values) of reactive current (or reactive power) from the power grid 101.

Referring now to operation 210, and in some embodiments, the controller 103 can maintain the value of the parameter as the offset value. Once the controller 103 adjusts the value of the parameter, the controller 103 can maintain the value of the parameter as the offset value for a period of time. Maintaining the value as the offset value for the period of time can cause the controller 103 to regulate an amount of reactive current (or reactive power) consumed by the generator system 100 (e.g., responsive to a fault). In some embodiments, the period of time comprises a duration of the fault or 2-3 seconds (or other amounts of time) following the duration of the fault. For example, the controller 103 can adjust the output voltage of the generator system 100 (or other parameters) by a predetermined offset (e.g., voltage offset) that is large enough to provide reactive current adjustment (e.g., reactive power support). Responsive to adjusting the output voltage value, the controller 103 maintains the adjusted output voltage value for at least 2-3 seconds (or other amounts of time) following the duration of the fault to regulate the amount of reactive current consumed by the generator system 100.

Referring now to operation 212, and in some embodiments, the controller 103 can modify the value of the parameter to the normal value and the power regulation mode to the identified power regulation mode. After a period of time (e.g., a duration of the fault), the controller 103 may modify the value of the parameter from the offset value to the normal value. For instance, the controller 103 may remove the predetermined offset from the offset value to modify the value of the parameter to the normal value (e.g., the value prior to the fault). Likewise, the controller 103 can modify the power regulation mode from the offset power regulation mode to the identified power regulation mode after the period of time. For example, after the period of time lapses, the controller 103 may switch the power regulation mode from the power factor offset regulation mode (or other offset power regulation modes) to the power factor regulation mode (or other power regulation modes).

Figure 3:
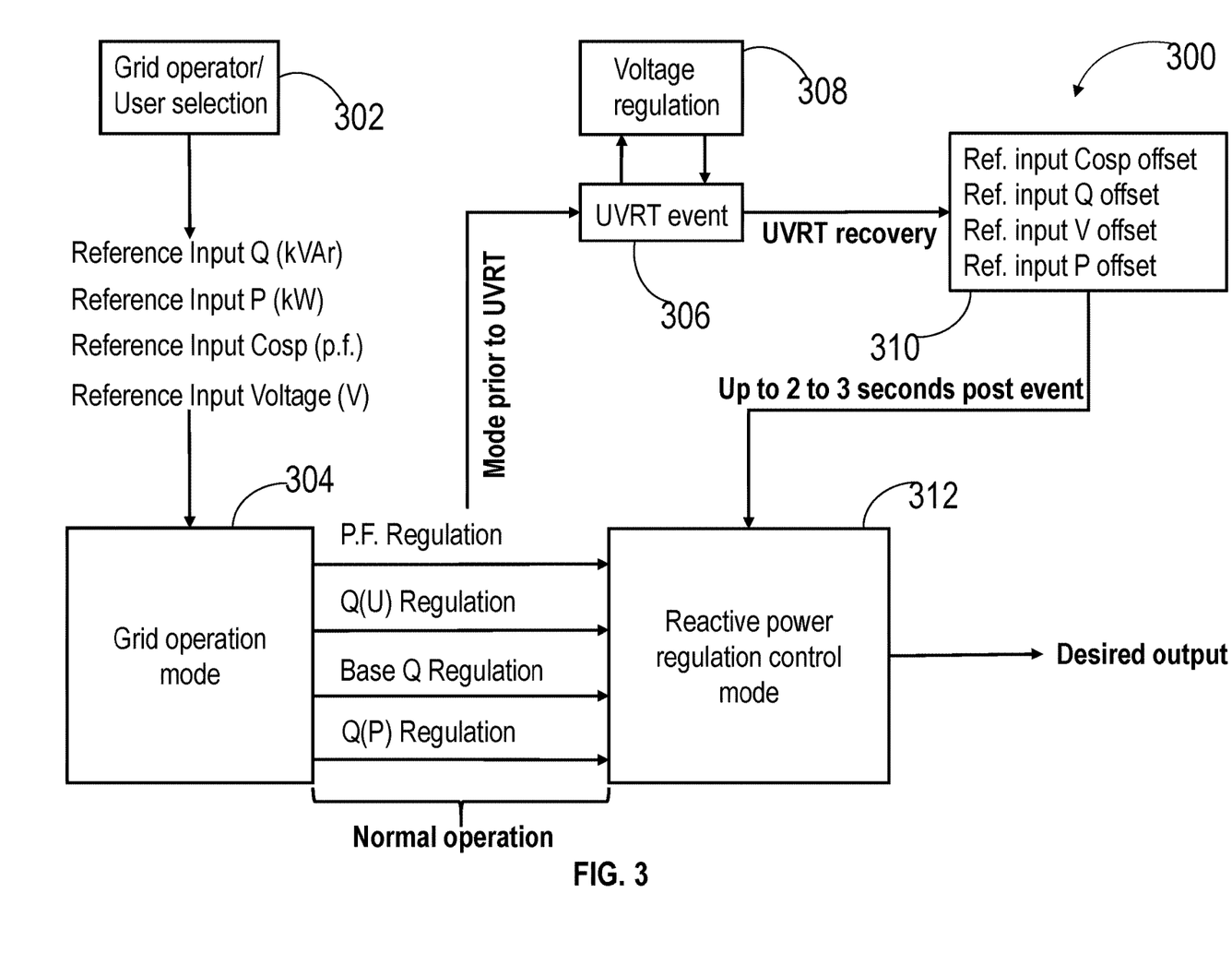
FIG. 3 is a flow diagram of a process for controlling a reactive power output of a generator system during a fault according to an exemplary embodiment.

FIG. 3 illustrates a process 300 for controlling a reactive power output of a generator system 100 during a fault (e.g., a LVRT). Various parts of FIG. 1 may be referenced for purposes of demonstration while discussing FIG. 3. In operation 302, a user or grid operator can select at least one reference input signal of the generator system 100. The reference input signal includes a reference input reactive power (Q(kVAr)), a reference input active power (P(kW)), a reference input power factor (Cosp(p.f.)), a reference input voltage (Voltage(V)), or other reference input signals. The selected reference input signal can determine the power regulation mode of the generator system 100. For example, if a user selects a reference input voltage as the reference input signal, the generator system 100 may operate in a reactive power regulation over voltage changes mode. Therefore, the selected reference input signal may determine the parameter of the generator system 100 that is adjusted (e.g., adjusted by the controller 103) to regulate the reactive power of the generator system 100. One or more components of the generator system 100 (e.g., controller 103, AVR 104, and/or other components) can use the reference input signal as a nominal value for adjusting the value of the parameter of the generator system 100 (e.g., power factor, output voltage, reactive power, or active power).

In operation 304, the generator system 100 may use the selected reference input signal to determine the power regulation mode (e.g., grid operation mode) of the generator system 100. For example, if a grid operator selects a reference input power factor, the generator system 100 can determine the power regulation mode corresponds to a power factor regulation mode. Therefore, the generator system 100 (e.g., a controller 103) can adjust the power factor value of the output of the generator 102 to regulate the reactive current or reactive power of the generator system 100. In some embodiments, the generator system 100 may operate in the selected power regulation mode until a fault (e.g., LVRT) occurs.

In operation 306, a UVRT event (or other faults) occurs in the power grid 101. The controller 103 (or other components of the generator system 100) may detect the UVRT and identify the power regulation mode of the generator system 100 (e.g., mode prior to UVRT) responsive to detecting the UVRT. In some embodiments, the controller 103 may detect the UVRT event by comparing a measurement of the generator system 100 (e.g., output voltage of the generator 102) to a nominal value (e.g., pre-selected by the user or grid operator). In operation 308, the generator system 100 can initiate the process of voltage regulation responsive to detecting the UVRT event (or other faults). For example, the controller 103 may detect the UVRT event and communicate the detection (e.g., via the input/output interface 131) to the AVR 104 (e.g., via the input/output interface 140). If the AVR 104 receives notification of a detected fault (e.g., UVRT event), the AVR 104 may attempt to regulate the voltage of the output of the generator 102. Responsive to the voltage regulation, the controller 103 (or other components of the generator system 100) may cause the generator system 100 to support a process of recovery (e.g., UVRT recovery) from the fault. The process of recovery may include adjusting a value of a parameter (or reference input signal) of the generator system 100 using an offset to regulate the amount of reactive current (or reactive power) consumed by the generator system 100 (e.g., responsive to the fault).

In operation 310, the controller 103 may use an offset to modify the value of the reference input signal (e.g., selected by the user of grid operator) responsive to initiating the recovery process. In some embodiments, the controller 103 can modify the value of the reference input signal by adding (or performing other operations) the offset to the reference input signal. The controller 103 can modify the value of the reference input signal (e.g., using the offset) to regulate the amount of reactive current (or reactive power) consumed by the generator system 100 (e.g., responsive to a fault). In some embodiments, the generator system 100 may regulate the amount of reactive current by using the reference input signal, the offset, or the modified reference input signal as inputs to the controller 103, therefore causing the controller 103 to change into another operating state. The operating state of the controller 103 can correspond to an operating state where reactive current consumption is regulated according to certain specifications. In some embodiments, the controller 103 may switch the power regulation mode to an offset power regulation mode to modify the reference input signal (e.g., using the offset).

In some embodiments, the offset includes a reference input power factor (Cosp) offset, a reference input reactive power (Q) offset, a reference input voltage (V) offset, a reference input active power (P) offset, or other offsets. The controller 103 (or other components of the generator system 100) may determine the offset according to the selected reference input signal or the identified power regulation mode (e.g., the identified power regulation mode responsive to a fault). For example, the controller 103 can determine to use the reference input reactive power offset to modify the value of the reference input signal if the reference input signal corresponds to the reference input reactive power. In another example, the controller 103 can determine to use the reference input active power offset if the identified power regulation mode corresponds to the reactive power regulation over active power changes mode. Responsive to modifying the value of the reference input signal with the offset, the controller 103 can maintain the modified value for a period of time (e.g., up to 2 to 3 seconds post event). By maintaining the modified value for the period of time, the controller 103 can support the recovery process by regulating the amount of reactive current (or reactive power) consumed (or supplied) by the generator system 100. For example, maintaining the modified value for the period of time can cause the generator system 100 to consume less than 5% of reactive current after a fault occurs.

In operation 312, the controller 103 (or other components of the generator system 100) may determine the power regulation mode (e.g., reactive power regulation control mode) of the generator system 100. For example, the controller 103 may change the power regulation mode to at least one of the offset power regulation modes (e.g., using an offset to modify the value of the reference input signal) responsive to the occurrence of a fault. After a certain period of time (e.g., up to 2-3 seconds post event), the controller may switch the power regulation mode to at least one of the identified power regulation modes (e.g., power regulation mode prior to detecting the fault). The desired output corresponds to the power regulation mode determined by the controller 103.

Figure 4:
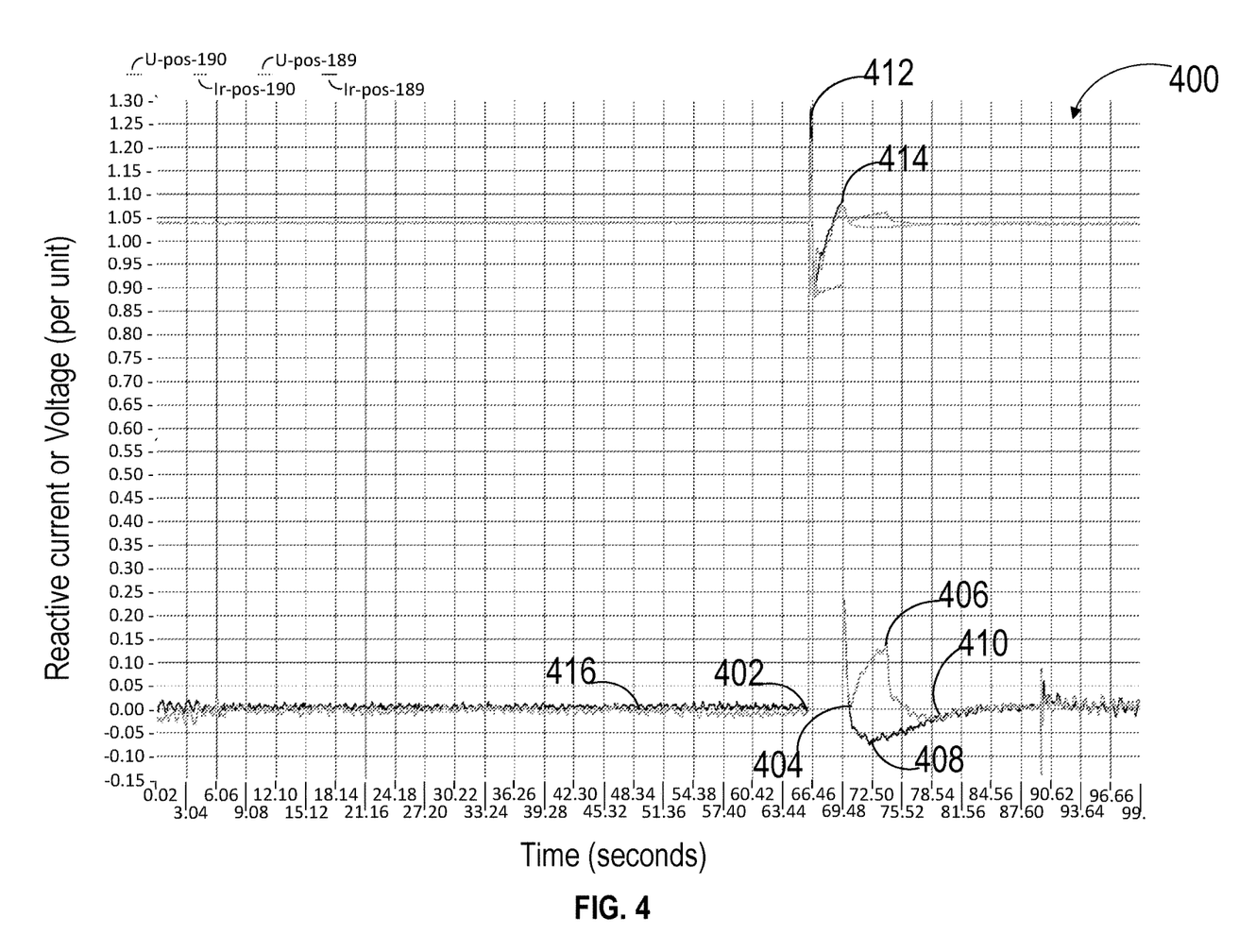
FIG. 4 is a graph depicting results of a generator system in response to a low voltage ride-through (LVRT) according to an exemplary embodiment.

FIG. 4 illustrates a graph 400 depicting results of a generator system 100 in response to a LVRT. The graph 400 includes a y-axis indicating values for the voltages (in units of per unit) and reactive current (in units of per unit) of the generator system 100. The graph 400 includes an x-axis indicating time (in units of seconds). At the onset of the LVRT event (e.g., point 402) the reactive current of the generator system 100 can increase to a certain value (e.g., 1.24 per unit, point 412) above the nominal value (e.g., 0 per unit, point 416). For the duration of the LVRT event (e.g., denoted in the graph between points 402 and 404), the reactive current of the generator system 100 may hold the value above the nominal value. In some embodiments, the controller 103 can use a power factor offset to modify the value of a parameter of the generator system 100 while the generator system 100 operates in reactive power regulation over voltage changes mode. The controller 103 can apply the power factor offset to the value of the parameter at the onset of the LVRT event (e.g., point 402). In some embodiments, the controller 103 can modify the value of a parameter of the generator system 100 using a voltage offset while the generator system 100 operates in reactive power regulation over voltage changes mode. The controller 103 can apply the voltage offset to the value of the parameter at the onset of the LVRT event (e.g., point 402).

At the offset of the LVRT event (e.g., point 404), the controller 103 can maintain the modified value of the parameter (e.g., modified by using an offset) for at least 2-3 seconds after the offset of the LVRT event (e.g., depicted in the graph 400 in points 406 and 408). If the controller 103 uses a power factor offset while the generator system 100 operates in reactive power regulation over voltage changes mode, the generator system 100 may consume (or import) reactive current from the power grid 101 (e.g., point 408) until the offset is removed. The reactive current returns to the nominal value (e.g., 0 per unit, point 410) responsive to removing the offset from the value of the parameter. If the controller 103 uses a voltage offset while the generator system 100 operates in reactive power regulation over voltage changes mode, the generator system 100 may supply (or export) reactive current to the power grid 101 (e.g., point 406) until the offset is removed. The reactive current returns to the nominal value (e.g., 0 per unit, point 410) responsive to removing the offset from the value of the parameter. Using the voltage offset to modify the parameter (e.g., output voltage of the generator 102) while the generator system 100 operates in reactive power regulation over voltage changes mode (e.g., Q(U) mode) can cause the generator system 100 to minimize or eliminate reactive power consumption after the LVRT event passes (e.g., point 404).

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media that can be accessed by a computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a computer or other machine with a processor. Combinations of the above are also included within the scope of machine-readable storage media. Machine-executable instructions include, for example, instructions and data which cause a computing device or machine to perform a certain function or group of functions. Machine or computer-readable storage media, as referenced herein, do not include transitory media (i.e., signals in space).

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a computing device that includes, for example, a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method comprising:
   detecting, by a controller, a fault associated with electrical power;
   determining, by the controller, a power regulation mode from a set of power regulation modes, responsive to detecting the fault, each of the set of power regulation modes associated with a corresponding parameter to control, based on a reference input signal associated with the corresponding parameter;
   switching, by the controller, the power regulation mode to an offset power regulation mode responsive to identifying the power regulation mode;
   adjusting, by the controller, a value of a parameter from a normal value to an offset value, wherein the parameter is selected based on the offset power regulation mode, wherein the offset value is different for each of the set of power regulation modes;
   maintaining, by the controller, the value of the parameter as the offset value for a period of time to regulate an amount of reactive current consumed; and
   modifying, by the controller, the value of the parameter from the offset value to the normal value, and the power regulation mode from the offset power regulation mode to the identified power regulation mode after the period of time.

2. The method of claim 1, wherein the fault comprises a low voltage ride-through (LVRT) event.

3. The method of claim 1, further comprising:
   identifying, by the controller, the parameter based on the power regulation mode,
   wherein the parameter comprises at least one of a power factor, an output voltage, a reactive power, or an active power.

4. The method of claim 3, wherein the set of power regulation modes comprises two or more of:
   a power factor regulation mode in which the controller adjusts the power factor to regulate the reactive power,
   a reactive power regulation over voltage changes mode in which the controller adjusts the output voltage to regulate the reactive power,
   a reactive power regulation mode in which the controller adjusts a reactive power set point by supplying a field current to regulate the reactive power, and
   a reactive power regulation over active power changes mode in which the controller adjusts the active power to regulate the reactive power.

5. The method of claim 3, comprising:
   selecting, by the controller from a set of offset power regulation modes, the offset power regulation mode based on the power regulation mode, each of the set of offset power regulation modes associated with a corresponding parameter to control; and
   adjusting, by the controller, the value of the parameter to the offset value using a predetermined offset,
   wherein the predetermined offset comprises at least one of a power factor offset, a voltage offset, a reactive power offset, or an active power offset.

6. The method of claim 5, wherein the set of offset power regulation modes comprises two or more of:
   a power factor offset regulation mode in which the controller adjusts a value of the power factor using the predetermined offset to regulate the amount of reactive current consumed,
   a reactive power regulation over voltage offset mode in which the controller adjusts a value of the output voltage using the predetermined offset to regulate the amount of reactive current,
   a reactive power offset regulation mode in which the controller adjusts a value of the reactive power using the predetermined offset to regulate the amount of reactive current, and
   a reactive power regulation over active power offset mode in which the controller adjusts a value of the active power using the predetermined offset to regulate the amount of reactive current.

7. The method of claim 1, wherein the normal value comprises the value of the parameter prior to detecting the fault and the offset value comprises the normal value adjusted by a predetermined offset, wherein the predetermined offset is large enough such that reactive power consumption does not increase by more than a defined value.

8. A controller comprising:
   a processing circuit configured to:
      detect a fault associated with electrical power;
      determine a power regulation mode from a set of power regulation modes, responsive to detecting the fault, each of the set of power regulation modes associated with a corresponding parameter to control, based on a reference input signal associated with the corresponding parameter;
      switch the power regulation mode to an offset power regulation mode responsive to identifying the power regulation mode;
      adjust a value of a parameter from a normal value to an offset value, wherein the parameter is selected based on the offset power regulation mode, wherein the offset value is different for each of the set of power regulation modes;
      maintain the value of the parameter as the offset value for a period of time to regulate an amount of reactive current consumed; and
      modify the value of the parameter from the offset value to the normal value, and the power regulation mode from the offset power regulation mode to the identified power regulation mode after the period of time.

9. The controller of claim 8, wherein the processing circuit is configured to:
   identify the parameter based on the power regulation mode,
   wherein the parameter comprises at least one of a power factor, an output voltage, a reactive power, or an active power.

10. The controller of claim 9, wherein the set of power regulation modes comprises two or more of:
    a power factor regulation mode in which the processing circuit is configured to adjust the power factor to regulate the reactive power,
    a reactive power regulation over voltage changes mode in which the processing circuit is configured to adjust the output voltage to regulate the reactive power,
    a reactive power regulation mode in which the processing circuit is configured to adjust a reactive power set point by supplying a field current to regulate the reactive power, and a reactive power regulation over active power changes mode in which the processing circuit is configured to adjust the active power to regulate the reactive power.

11. The controller of claim 9, wherein the processing circuit is configured to:
select the offset power regulation mode from a set of offset power regulation modes, based on the power regulation mode, each of the set of offset power regulation modes associated with a corresponding parameter to control; and
adjust the value of the parameter to the offset value using a predetermined offset,
wherein the predetermined offset comprises at least one of a power factor offset, a voltage offset, a reactive power offset, or an active power offset.

12. The controller of claim 11, wherein the set of offset power regulation modes comprises two or more of:
a power factor offset regulation mode in which the processing circuit is configured to adjust a value of the power factor using the predetermined offset to regulate the amount of reactive current consumed,
a reactive power regulation over voltage offset mode in which the processing circuit is configured to adjust a value of the output voltage using the predetermined offset to regulate the amount of reactive current,
a reactive power offset regulation mode in which the processing circuit is configured to adjust a value of the reactive power using the predetermined offset to regulate the amount of reactive current, and
a reactive power regulation over active power offset mode in which the processing circuit is configured to adjust a value of the active power using the predetermined offset to regulate the amount of reactive current.

13. The controller of claim 8, wherein the normal value comprises the value of the parameter prior to detecting the fault and the offset value comprises the normal value adjusted by a predetermined offset, wherein the predetermined offset is large enough such that reactive power consumption does not increase by more than a defined value.

14. The controller of claim 8, wherein the processing circuit is configured to regulate an output voltage.

15. A system comprising:
a voltage regulator configured to regulate a voltage of an output, a power factor of the output, a reactive power of the output, or an active power of the output to a normal value or an offset value; and
a controller configured to:
detect a fault associated with electrical power,
determine a power regulation mode from a set of power regulation modes, responsive to detecting the fault, each of the set of power regulation modes associated with a corresponding parameter to control, based on a reference input signal associated with the corresponding parameter,
switch the power regulation mode to an offset power regulation mode responsive to identifying the power regulation mode,
adjust a value of a parameter from a normal value to an offset value, wherein the parameter is selected based on the offset power regulation mode, wherein the offset value is different for each of the set of power regulation modes,
maintain the value of the parameter as the offset value for a period of time to regulate an amount of reactive current consumed, and
modify the value of the parameter from the offset value to the normal value, and the power regulation mode from the offset power regulation mode to the identified power regulation mode after the period of time.

16. The system of claim 15, wherein the controller is configured to:
identify the parameter based on the power regulation mode,
wherein the parameter comprises at least one of a power factor, an output voltage, a reactive power, or an active power.

17. The system of claim 16, wherein the set of power regulation modes comprises two or more of:
a power factor regulation mode in which the controller is configured to adjust the power factor to regulate the reactive power,
a reactive power regulation over voltage changes mode in which the controller is configured to adjust the output voltage to regulate the reactive power,
a reactive power regulation mode in which the controller is configured to adjust a reactive power set point by supplying a field current to regulate the reactive power, and
a reactive power regulation over active power changes mode in which the controller is configured to adjust the active power to regulate the reactive power.

18. The system of claim 16, wherein the controller is configured to:
select the offset power regulation mode from a set of offset power regulation modes, based on the power regulation mode, each of the set of offset power regulation modes associated with a corresponding parameter to control; and
adjust the value of the parameter to the offset value using a predetermined offset,
wherein the predetermined offset comprises at least one of a power factor offset, a voltage offset, a reactive power offset, or an active power offset.

19. The system of claim 18, wherein the set of offset power regulation modes comprises at least one of:
a power factor offset regulation mode in which the controller is configured to adjust a value of the power factor using the predetermined offset to regulate the amount of reactive current consumed,
a reactive power regulation over voltage offset mode in which the controller is configured to adjust a value of the output voltage using the predetermined offset to regulate the amount of reactive current,
a reactive power offset regulation mode in which the controller is configured to adjust a value of the reactive power using the predetermined offset to regulate the amount of reactive current, and
a reactive power regulation over active power offset mode in which the controller is configured to adjust a value of the active power using the predetermined offset to regulate the amount of reactive current.

20. The system of claim 15, wherein the voltage regulator has a first priority to regulate the voltage of the output and a second priority to regulate the power factor of the output.

* * * * *